United States Patent [19]
Davis et al.

[11] Patent Number: 5,845,926
[45] Date of Patent: Dec. 8, 1998

[54] INDEPENDENT SUSPENSION APPARATUS FOR A WHEELED VEHICLE

[75] Inventors: Jeffrey Davis, Brighton; Huibert Mees, Livonia; Manfred Carl Rumpel, Bloomfield Hills, all of Mich.

[73] Assignee: Ford Global Technologies, Inc., Dearborn, Mich.

[21] Appl. No.: 787,510

[22] Filed: Jan. 21, 1997

[51] Int. Cl.$^6$ .................................................. B60G 3/00
[52] U.S. Cl. .......................................... 280/690; 280/675
[58] Field of Search ..................................... 280/673, 674, 280/675, 688, 690, 691; 403/113, 114, 122

[56] References Cited

U.S. PATENT DOCUMENTS

| | | |
|---|---|---|
| 4,457,537 | 7/1984 | von der Ohe et al. . |
| 4,462,609 | 7/1984 | von der Ohe . |
| 4,583,759 | 4/1986 | Kami et al. . |
| 4,744,586 | 5/1988 | Shibahata et al. ............... 280/689 |
| 4,902,033 | 2/1990 | Tonomura . |
| 4,925,207 | 5/1990 | Haraguchi ......................... 280/675 |
| 4,943,082 | 7/1990 | Kijima et al. ..................... 280/673 |
| 4,968,056 | 11/1990 | Haraguchi . |
| 4,982,978 | 1/1991 | Kawasaki . |
| 5,058,867 | 10/1991 | Hadano et al. .................... 280/673 |
| 5,516,130 | 5/1996 | Mitchell . |

FOREIGN PATENT DOCUMENTS

| | | | |
|---|---|---|---|
| 2035307 | 1/1972 | Germany ........................ 280/690 |

*Primary Examiner*—Paul N. Dickson
*Attorney, Agent, or Firm*—Gregory P. Brown

[57] ABSTRACT

An independent suspension apparatus suitable for use in a motor vehicle capable of decoupling longitudinal and lateral load transfers is described. The suspension includes upper and lower control arms (22, 24), each having first and second ends (30, 32, 40, 42) respectively, being pivotably attached to a vehicle structure. Each of the control arms also includes an outer end (34, 44) for attachment to a wheel support member (12). A toe link (26) is provided for controlling toe change during dynamic loading of the suspension. The upper and lower control arms (22, 24) are arranged so as to provide a decoupling of the longitudinal and lateral load paths between a wheel support member (12) and the vehicle structure (10). This allows the use of restricted motion joints in the lateral load path to reduce camber changes normally resulting from the necessary use of compliant bushings found in the lateral load path.

9 Claims, 2 Drawing Sheets

INDEPENDENT SUSPENSION APPARATUS FOR A WHEELED VEHICLE

BACKGROUND OF THE INVENTION

1. Field of the Invention

This invention relates generally to an independent suspension for use on a motor vehicle. More particularly, the present invention relates to an independent suspension having suspension members arranged to decouple longitudinal and lateral load paths between a wheel support member and a motor vehicle structure.

2. Disclosure Information

Independent suspensions using 'A'-shaped control arms are well known in the motor vehicle industry. The design is desirable for its ability to maintain a tire and wheel assembly in a predetermined relationship with a road surface. Two parameters used to measure this relationship are "toe" and "camber". Toe refers to the orientation of the wheel and tire assembly about a vertical axis. "Toe-in" refers to a condition where the leading edge of the tire and wheel assembly has rotated, or turned, inward toward the center of the vehicle. Camber refers to the vertical angle of the tire and wheel assembly relative to the longitudinal plane of the vehicle. As a suspension undergoes dynamic loading, it is desirable to manage toe change to improve the dynamic response of the vehicle. It is also desirable to provide optimal camber change during dynamic loading, especially lateral, of the suspension.

The major source of camber change during dynamic loading occurs due to deformation of the elastomeric bushings used to mount the control arms to the wheel support member and the vehicle structure. The elastomeric bushings common in todays suspensions are necessary to provide isolation from the dynamic loads imparted on the suspension during operation. Typically, when the vehicle encounters bumps, chuckholes etc., the suspension attachment joints must deflect to provide adequate isolation, thus ensuring customer satisfaction. However, suspension designers cannot simply provide large amounts of deflection for isolation purposes, as this could negatively impact the steering handling performance of the vehicle. Thus, in conventional designs, a compromise must be made between isolation the handling performance.

It would therefore be desirable to provide a suspension design capable of decoupling isolation from handling performance such that a suspension could be designed that provided both optimal handling performance as well as sufficient isolation to satisfy customers.

SUMMARY OF THE INVENTION

According to the present invention, a rear suspension apparatus for a motor vehicle is provided for decoupling the lateral and longitudinal load paths from the suspension into a vehicle structure. The rear suspension apparatus comprises a wheel support member having upper and lower ends. The suspension also includes an upper control arm having first and second upper ends pivotably connected to the vehicle structure and an outer upper end connected to the upper end of the wheel support member. The suspension further includes a lower control arm having first and second lower ends pivotably connected to the vehicle structure and an outer lower end connected to the lower end of the wheel support member.

The first and second lower ends of the lower control arm pivot about an axis which is coaxial with respect to a straight line (L1), which extends forwardly, outwardly and upwardly from the second end toward the first end of the lower control arm with respect to a longitudinal axis (LV) of the motor vehicle. The second lower end and the outer lower end of the lower control arm are located on a straight line (L2), which substantially perpendicularly intersects the longitudinal axis (LV) of the motor vehicle.

Similarly, the first and second upper ends of the upper control arm pivot about an axis which is coaxial with respect to straight line (L3), which extends forwardly, outwardly and downwardly from the second upper end toward the first upper end of the upper control arm with respect to the longitudinal axis (LV) of the motor vehicle. The second upper end and the outer upper end of the upper control arm are located on a straight line (L4), which substantially perpendicularly intersects the longitudinal axis (LV) of the motor vehicle.

An advantage of this rear suspension apparatus is to decouple the longitudinal and lateral load paths between the wheel support member and the vehicle structure, thereby allowing for appropriate isolation while providing sufficient lateral load path stiffness to minimize or eliminate undesirable camber and/or toe changes due to compliance of the suspension joints.

DETAILED DESCRIPTION OF THE PREFERRED EMBODIMENT

Figure 1:
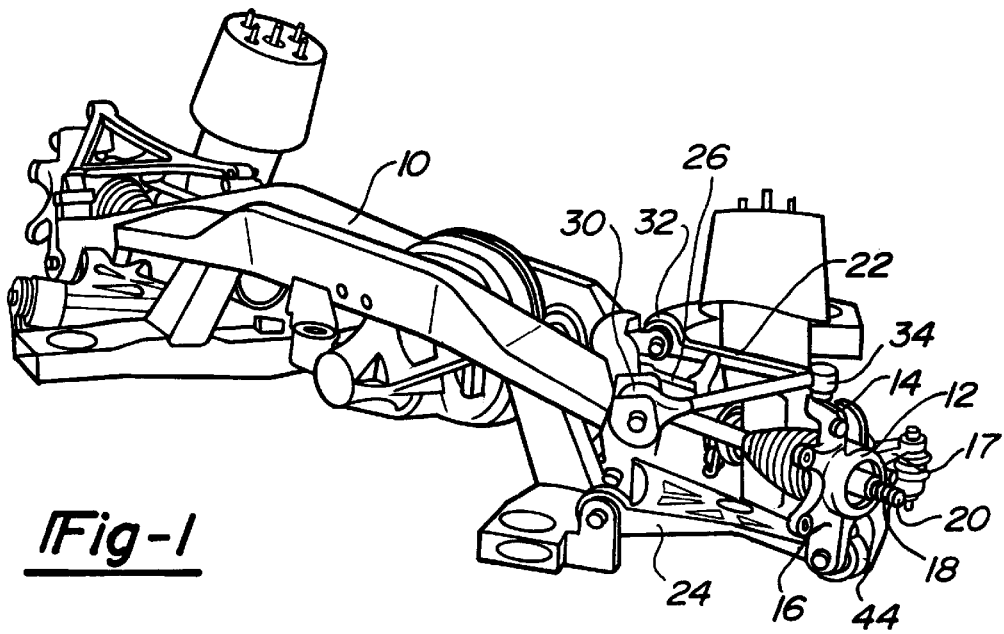
FIG. 1 is a perspective view of a rear suspension apparatus located in a motor vehicle structure in accordance with the present invention.

Referring now to FIG. 1, a suspension for a motor vehicle is shown attached to a subframe, which is a component of the vehicle structure 10. The term "structure" when used in this specification and claims will be understood to refer to either a conventional vehicle chassis having body on frame construction or a conventional unitary chassis and body construction, which may or may not incorporate subframes therein. In any event, the structure makes up a part of the sprung mass of the vehicle and provides a foundation for suspension attachement.

The suspension comprises a wheel support member 12 having upper and lower ends 14, 16 and a rearward portion 17. An axle 18, which may be driven as illustrated, or imaginary on freewheeling axles, extends through a center 20 of the wheel support member 12. Upper and lower control arms 22, 24 and a toe link 26 connect the wheel support member 12 to the vehicle structure 10. It should be noted that only the left of the suspension will be described herein for purposes of simplicity, it being understood that the right side is simply the symmetric opposite of the left.

Figure 2:
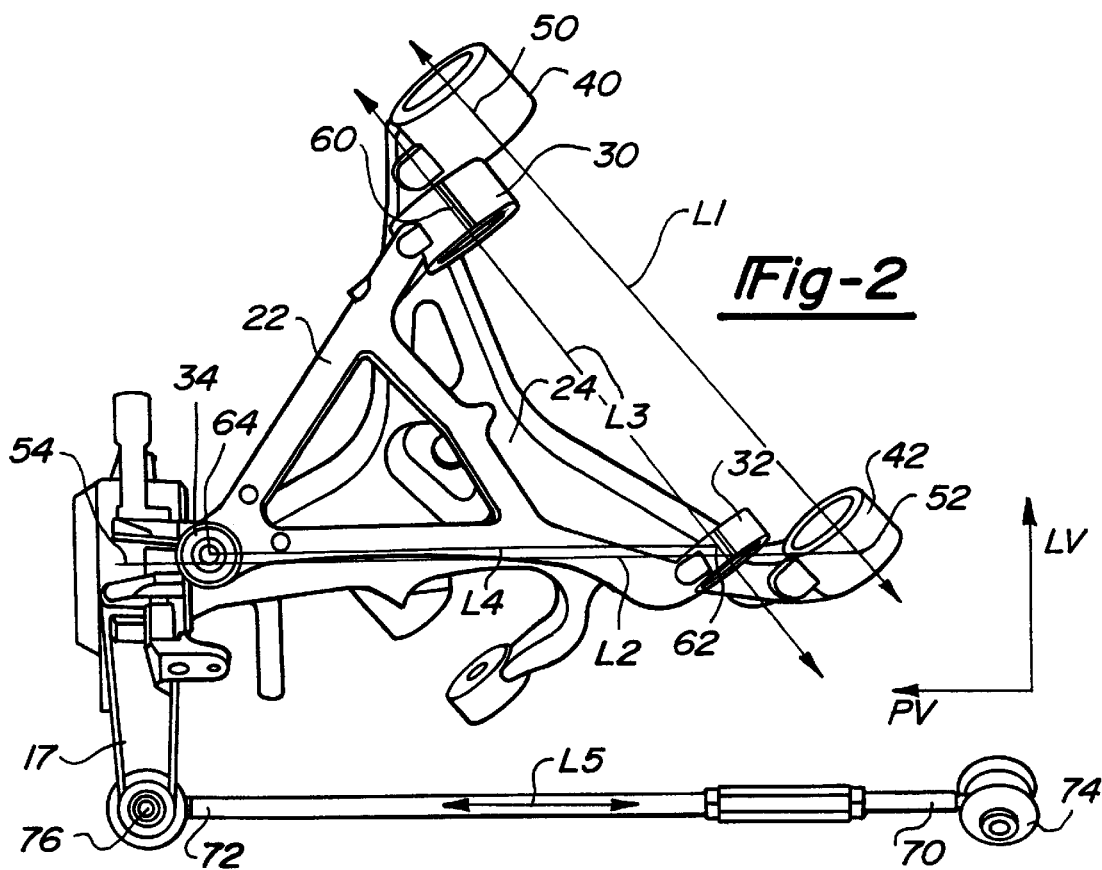
FIG. 2 is a plan view of a rear suspension apparatus according to the present invention.
Figure 3:
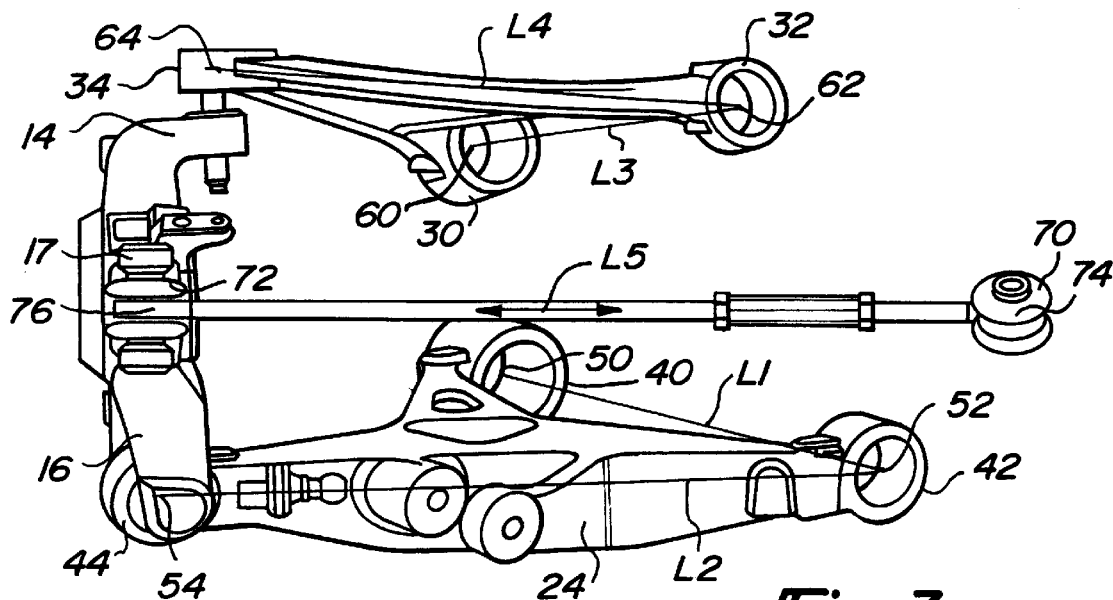
FIG. 3 is a rear view of a rear suspension apparatus according to the present invention.

Referring now to FIGS. 2 and 3, the upper control arm 22 is of the "A-shaped" type, including first and second upper ends 30, 32 for pivotably attaching to the vehicle structure 10. The upper control arm 22 also includes an outer upper end 34 for pivotably attaching to the upper end 14 of the wheel support member 12.

The lower control arm 24 is also of the A-shape type, including first and second lower ends 40, 42 for pivotably attaching to the vehicle structure 10. The lower control arm 24 also includes an outer lower end 44 for pivotably attaching to the lower end 16 of the wheel support member 12.

Being of the A-shape type, both the upper and lower control arms 22, 24 lie in predetermined planes which result in desirable suspension operating characteristics. As illustrated, the lower control arm lies in a plane defined by lines L1 and L2. Line L1 may be determined by drawing a line through centers 50, 52 of the joints disposed on the first and second lower ends 40, 42, respectively. The first and second lower ends 40, 42 are located such that line L1 extends forwardly, outwardly and upwardly from the second lower end 42 toward the first lower end 40 with respect to a longitudinal axis (LV) of the vehicle.

The second line, L2, may be determined by drawing a line through the center 52 of the second lower end 42 and a center 54 of the joint disposed on the outer lower end 44. The second lower end 42 and the outer lower end 44 are located such that an extension of line L2 would substantially perpendicularly intersect the longitudinal axis (LV) of the vehicle. It should be noted that in this regard, the longitudinal axis of the vehicle is not a single line, but contemplates any line lying in a vertical plane oriented longitudinally with respect to the longitudinal dimension of the motor vehicle. The second lower end 42 and the outer lower end 44 are also located such that line L2, when viewed from directly above, lies substantially directly under a line that would extend from the center 20 of the wheel support member 12 inwardly to substantially perpendicularly intersect the longitudinal axis (LV) of the vehicle. In the presently preferred embodiment, this line takes the form of the axle 18.

Similar to the orientation of the lower control arm 24, the upper control arm 22 lies in a plane defined by lines L3 and L4. Line L3 may be determined by drawing a line through centers 60, 62 of the joints disposed on the first and second upper ends 30, 32, respectively. The first and second lower ends 30, 32 are located such that line L3 extends forwardly, outwardly and downwardly from the second upper end 32 toward the first upper end 30 with respect to a longitudinal axis (LV) of the vehicle.

The second line, L4, may be determined by drawing a line through the center 62 of the second upper end 32 and a center 64 of the joint disposed on the outer upper end 34. The second upper end 32 and the outer upper end 34 are located such that an extension of line L4 would substantially perpendicularly intersect the longitudinal axis (LV) of the vehicle. The second upper end 32 and the outer upper end 34 are also located such that line L4, when viewed from directly above, lies substantially directly over the axle 18, like line L2.

The toe link 26 is preferably adjustable in length and includes an inner toe end 70 attached to the vehicle structure 10 and an outer toe end 72 attached to the rearward portion 17 of the wheel support member 12. As illustrated, the toe link 26 extends along a line, L5. Line L5 may be determined by drawing a line through centers 74, 76 of the joints disposed on the inner and outer toe ends 70, 72, respectively. These ends are located such that line L5 extends slightly forward from the inner toe end 70 toward the outer toe end 72. Additionally, it is desirable if, when viewed from the rear, the toe link 26 can be located such that Line L5 is as close as possible to being directly rearward of the axle 18.

The above described novel suspension geometry provides several operating advantages for increased vehicle stability, however, perhaps its greatest advantage lies in its ability to decouple longitudinal and lateral load paths. Decoupling the lateral load path from the longitudinal load path allows the use of stiff or no transational compliance joints in the lateral load path previously unacceptable due to their unacceptable transmissibility of noise and vibration.

In view of this, the presently preferred embodiment makes use of restricted motion joints in the lateral load path. The resulting suspension provides handling performance that customers would describe as crisp, rapid response to steering inputs by the driver. Conventional joints are also used in the longitudinal load path to provide isolation from longitudinal force inputs.

One example of a restricted motion joint contemplated for use in the present invention is a conventional ball joint. A conventional ball joint provides three degrees of rotational freedom and no translational degrees of freedom. Therefore, it is considered rigid from a displacement standpoint and relatively unconstrained from a rotational standpoint. In the present invention a ball joint is preferred for providing the connection of the outer upper end 34 of the upper control arm 22 to the upper end 14 of the wheel support member 12.

Figure 4:
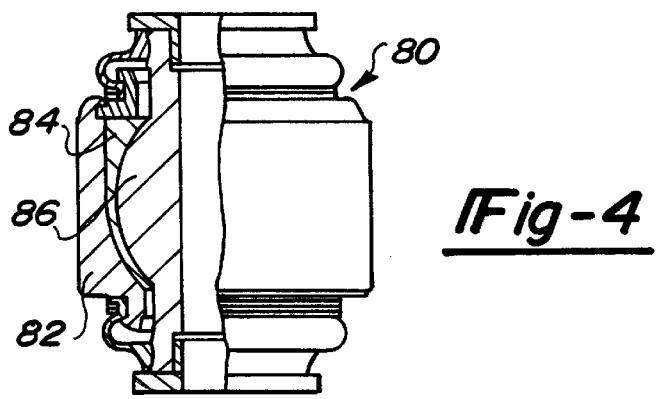
FIG. 4 is a partial sectional view of a restricted motion joint for use in a rear suspension apparatus according to the present invention.

FIG. 4 illustrates another example of a restricted motion joint contemplated for use in the present invention known as a cross axis joint 80. A cross axis joint is similar to a rod end in that it allows three rotational degrees of freedom and no translational degrees of freedom. However, there may be a degree of elasticity built into the rotational degrees of freedom to provide some resistance to rotations. The cross axis joint 80 includes a housing 82 having a bore for receiving a race 84. A substantially rigid bushing 86 is disposed within the race 84 and includes a bore therethrough for receiving a threaded fastener for attachment to the vehicle structure. The outer diameter of the housing 82 is sized to allow a press fit relationship within a bore formed in the end a control arm.

In the preferred embodiment, a cross axis joint 80 provides connection at the second upper end 32, the second lower end 42 and the outer lower end 44. Thus, restricted motion joints are located at each of the pivotable connections in the lateral load path. Additionally, the inner and outer toe ends 70, 72 of the toe link 26 include restricted motion joints such as cross axis joint 80.

Figure 5:
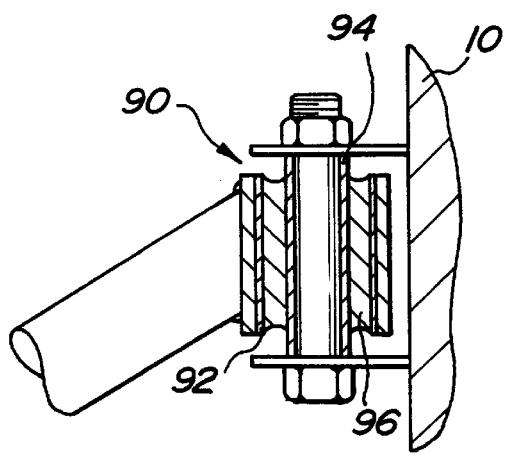
FIG. 5 is a partial sectional view of a conventional elastomeric joint for use in a rear suspension apparatus according to the present invention.

FIG. 5 illustrates a conventional elastomeric bushing 90 commonly used for suspension attachment. The elastomeric bushing 90 includes an outer sleeve 92 having an outer diameter permitting a press fit relationship with a bore formed in the end of a control arm. An inner sleeve 94 is coaxially disposed within the outer sleeve 92 forming an annular region therebetween which is filled with an elastomeric material 96 having a predetermined durometer. A threaded fastener passes through a bore in the inner sleeve for attachment with the vehicle structure 10. This type of joint permits three degrees of rotational freedom as well three degrees of translational freedom and is very effective for providing vibration isolation. In the present invention, elastomeric bushings 90 provide connection at the first upper end 30 and the first lower end 40. Thus, elastomeric joints are located at each of the pivotable connections in the longitudinal load path to provide isolation from longitudinal forces.

During operation, the primary benefit of decoupling the load paths and the resultant ability to use restricted motion joints comes from the reduction in compliant camber change under lateral loads generated during vehicle maneuvers. The reduction in camber change provides a consistent tire to road interface, resulting in improved static and dynamic lateral acceleration capability. The driver perceives this as a more responsive vehicle to steering inputs. Additionally, the elimination of compliance in the lateral load path provides a suspension that tracks the desired course more quickly and accurately than a suspension with lateral compliance.

The toe change characteristics of the suspension are controlled through the novel implementation of the toe link 26. Dynamic longitudinal loading can cause the suspension to toe in or toe out, which in turn can change the vehicle's natural tendency to understeer or oversteer. The present invention assures desirable toe change under varying longitudinal load conditions. However, the degree of toe out is controlled by the length of the rearward portion 17 of the wheel support member 12. Similarly, when the wheel encounters a bump, the natural tendency again is toward toe out. However, due to the forward skew of the toe link, the suspension actually toes in.

The foregoing description presents one embodiment of the present invention. Details of construction have been shown and described for purposes of illustration rather than limitation. For instance, it should be recognized by those skilled in the art that elastomeric bushings having a very high durometer, or constructed from a rigid material, could be substituted for the cross axis joints described above, while providing the equivalent operability and functionality. Modifications and alterations of the invention will no doubt occur to those skilled in the art that will come within the scope and spirit of the following claims.

What is claimed:

1. A rear suspension apparatus for a motor vehicle, said rear suspension apparatus comprising:

a vehicle structure having a longitudinal axis (LV);

a wheel support member having upper and lower ends;

an upper control arm having first and second upper ends pivotably connected to said vehicle structure and an outer upper end connected to said upper end of said wheel support member;

a lower control arm having first and second lower ends pivotably connected to said vehicle structure and an outer lower end connected to said lower end of said wheel support member;

an elastomeric bushing interposed between said first lower end and said vehicle structure; and a cross axis joint interposed between said second lower end and said vehicle structure;

said first and second lower ends pivot about an axis which is coaxial with respect to a straight line (L1), which extends forwardly, outwardly and upwardly from said second end toward said first end with respect to said longitudinal axis (LV);

said second lower end and said outer lower end being located on a straight line (L2), which substantially perpendicularly intersects said longitudinal axis (LV);

said first and second upper ends pivot about an axis which is coaxial with respect to straight line (L3), which extends forwardly, outwardly and downwardly from said second upper end toward said first upper end with respect to said longitudinal axis (LV);

said second upper end and said outer upper end being located on a straight line (L4), which substantially perpendicularly intersects said longitudinal axis (LV);

said lower control arm being operative to decouple longitudinal and lateral load paths such that said longitudinal load path acts upon said first lower end and said lateral load path acts upon said second lower end.

2. A rear suspension apparatus according to claim 1, further comprises:

a toe link having an inner toe end connected to said vehicle structure and an outer toe end connected to a rearward portion of said wheel support member;

said inner toe end and said outer toe end being located on a straight line (L5), which extends forwardly and outwardly from said inner toe end toward said outer toe end with respect to said longitudinal axis.

3. A rear suspension apparatus according to claim 2, wherein said outer toe end attaches to said rearward portion of said wheel support member so as to have a substantially common elevation with a center of said wheel support.

4. A rear suspension apparatus according to claim 1, further comprises a cross axis joint interposed between said outer lower end and said lower end of said wheel support member.

5. A rear suspension apparatus according to claim 1, further comprising:

a ball joint interposed between said outer upper end and said upper end of said wheel support member;

an elastomeric bushing interposed between said first upper end and said vehicle structure; and a cross axis joint interposed between said second upper end and said vehicle structure.

6. A rear suspension apparatus for a motor vehicle, said rear suspension apparatus comprising:

a vehicle structure having a longitudinal axis (LV);

a wheel support member having upper and lower ends;

an upper control arm having first and second upper ends pivotably connected to said vehicle structure and an outer upper end connected to said upper end of said wheel support member;

a ball joint interposed between said outer upper end and said upper end of said wheel support member;

a lower control arm having first and second lower ends pivotably connected to said vehicle structure and an outer lower end connected to said lower end of said wheel support member;

an elastomeric bushing interposed between said first lower end and said vehicle structure;

a cross axis joint interposed between said second lower end and said vehicle structure;

said first and second lower ends pivot about an axis which is coaxial with respect to a straight line (L1), which extends forwardly, outwardly and upwardly from said second end toward said first end with respect to said longitudinal axis (LV);

said second lower end and said outer lower end being located on a straight line (L2), which substantially perpendicularly intersects said longitudinal axis (LV);

said first and second upper ends pivot about an axis which is coaxial with respect to straight line (L3), which extends forwardly, outwardly and downwardly from said second upper end toward said first upper end with respect to said longitudinal axis (LV);

said second upper end and said outer upper end being located on a straight line (L4), which substantially perpendicularly intersects said longitudinal axis (LV);

a toe link having an inner toe end connected to said vehicle structure and an outer toe end connected to a rearward portion of said wheel support member;

said inner toe end and said outer toe end being located on a straight line (L5), which extends forwardly and outwardly from said inner toe end toward said outer toe end with respect to said longitudinal axis (LV);

wherein said lower control arm being operative to decouple longitudinal and lateral load paths such that said longitudinal load path acts upon said first lower end and said lateral load path acts upon said second lower end.

7. A rear suspension apparatus according to claim 6, wherein said outer toe end attaches to said rearward portion of said wheel support member so as to have a substantially common elevation with a center of said wheel support.

8. A rear suspension apparatus according to claim 6, further comprises a cross axis joint interposed between said outer lower end and said lower end of said wheel support member.

9. A rear suspension apparatus according to claim 6, further comprising:

an elastomeric bushing interposed between said first upper end and said vehicle structure; and a cross axis joint interposed between said second upper end and said vehicle structure.

* * * * *